United States Patent [19]
Brooks

[11] 3,941,948
[45] Mar. 2, 1976

[54] FOUR-WIRE INTERFACE REGULATOR FOR LONG DISTANCE TRUNK CIRCUITS

[76] Inventor: Fred A. Brooks, 37 Lancaster Ave., Maplewood, N.J. 07040

[22] Filed: Nov. 29, 1973

[21] Appl. No.: 420,247

[52] U.S. Cl. .......................... 179/170 R; 179/170.2
[51] Int. Cl.² ..................................... H04B 3/36
[58] Field of Search ........ 179/170 R, 170 C, 170.2, 179/16 F, 1 VL, 1 SC

[56] References Cited
UNITED STATES PATENTS

| | | | |
|---|---|---|---|
| 3,483,335 | 12/1969 | Piotrowski | 179/170 R |
| 3,567,873 | 3/1971 | Peroni | 179/170.2 |
| 3,585,311 | 6/1971 | Berkley et al. | 179/170.2 |
| 3,699,271 | 10/1972 | Berkley et al. | 179/170.6 |

*Primary Examiner*—Douglas W. Olms
*Attorney, Agent, or Firm*—Joseph E. Rusz; George Fine

[57] ABSTRACT

A four-wire interface regulator for long distance trunk circuits is provided in which the interface regulator separates the components of a conventional local plant output signal to change the relative magnitude of the components to deliver any desired output with a minimum variability to drive long distance trunk circuits.

2 Claims, 1 Drawing Figure

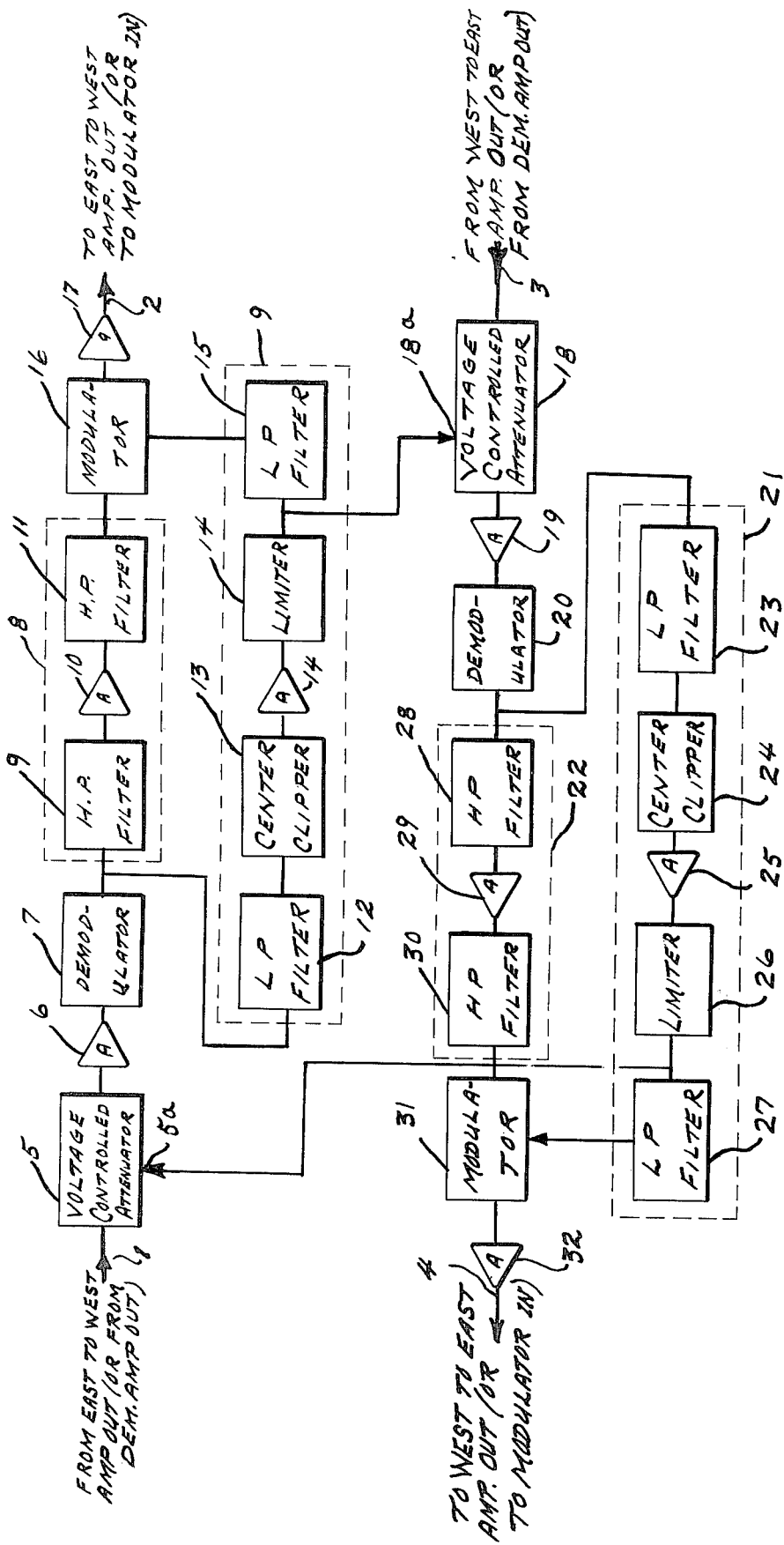

FOUR-WIRE INTERFACE REGULATOR FOR LONG DISTANCE TRUNK CIRCUITS

CROSS REFERENCE TO RELATED APPLICATION

The present invention is related to the patent application entitled, "SELF REGULATING TELEPHONE SETS" by Fred A. Brooks, Ser. No. 420,330 filed in the U.S. Patent Office at an even date herewith. The present invention is utilized as a interface regulator for long distance trunk circuits and is an improvement of the self regulating circuit shown and described in the other aforementioned patent application.

BACKGROUND OF THE INVENTION

This invention provides a new self regulating circuit between the local voice telephone plant and the input, output or interface between links of long distance built up voice trunks. Voice signals applied to long distance trunks may originate in any one of many different local switching areas having different mean volumes as well as individual circuit and talker variations. The voice signal generated in telephone sets and delivered over local loops to the input or delivered from long distance trunk circuits over local loops to the input or delivered from long distance trunks can be divided into two parts occupying different frequency bands; first, the amplitude of the informational voice signal occupies a frequency band from just above direct current to include all frequencies to just below about 100 Hertz at decreasing amplitudes with respect to frequency. Second, the information signal is usually considered to occupy a band from about 0.2 to 3.4 kiloHertz with about the same average power in each incremental band. These signals are generated in individual transducers in response to sound pressures from a universe of talkers. The electrical signal is usually considered to be a convolution of vocal cord frequencies, glottal and voice box impulses. That is, the signal is considered to be of the form $f(A)t \times f(B)t$. The frequencies contained in the individual terms are non-overlapping or nearly so, and can be separated by demodulation and frequency selection. The relative amplitudes of the components may be changed by equalization or amplification and attenuation of the individual components selected by filtering. The desired signal output can be attained from the telephone set by rearranging the relative amplitudes and recombining the components in a product modulator to obtain increased signal amplitude in the original form or as desired. The long distance transmission circuits were designed to give satisfactory performance when the signal applied has a specific means with a normal talker volume standard deviation produced by a talker sound pressures from large local office areas. When the signal originates in a small local office area, the mean volume changes from office to office. The variation between offices added to the variability of the talker sound pressure that might be applied to a transmitting transducer and in turn to a long distance trunk is increased above the variability of a individual talker from a particular large office area. The number of users rating the transmitting circuits "good" for trunks with booster station designed for a higher mean volume will be reduced with the increased standard deviation or variation of the applied talker signal. If the standard deviation of the voice signal is reduced, a greater proportion of the users will rate the circuit "good".

The object of this invention is to disclose a means of modifying and reducing the signal variation applied to long distance trunks from any originating local area. Preferred signal volume is delivered to the listener with a minimum amplitude change due to individual talkers at the trunk input. Variations in the net loss can be removed by providing a receiving regulator.

SUMMARY OF THE INVENTION

A four-wire interface regulator for long distance trunk circuits is provided. The components of the convoluted plant output signal are separated to change the relative magnitude of the components to deliver any desired output with a minimum variability to drive long distance trunk circuits. Self regulation of trunk circuits is obtained by using the received signals at either the input, output, or both, to deliver the desired signal to the trunk ongoing link or listener by separating the signal parts and modifying the relative amplitudes of the components. Combining the modified components produces the desired mean output with a reduced standard deviation. Center clipping is introduced to reduce signal amplitudes in the low amplitude component to reduce loop gain to provide control of howling through the coupling in the hand set at distant terminals. A circuit is provided in the return path of the trunk when the local transmitting circuit is active to prevent loop around instability when the transmission path gain is increased due to system regulation.

This invention makes it possible to drive long distance trunks to standard design volume although the locally generated signal which would be applied to the trunk is below the desired mean volume. It also provides a means of effectively interfacing links in built up long distance trunks although the originating volumes are unknown to deliver the necessary volume to the ongoing link to operate the link at design volume and deliver preferred listening volume. It further provides a constant output to listeners although the input signal may not be within design limits.

DESCRIPTION OF THE DRAWING

There is shown in block diagram form the single FIGURE of the preferred embodiment of this invention.

DETAILED DESCRIPTION OF THE PREFERRED EMBODIMENT

Now referring to the single FIGURE of the present invention, there is shown the self regulator which is connected as an interface between links of long distance built up voice trunks and may serve as a four wire interface for national and international telephone systems. The interface regulator receives an electrical signal representative of speech at input 1 which is labeled from east to west amplifier out or demodulator amplifier out (for carrier signals). Output 2 is labeled to east to west amplifier out or to modulator in (for carrier signals). Input 3 is labeled from west to east amplifier out or demodulator amplifier out (for carrier signals). Output 4 is labeled to west to east or to modulator in (for carrier signals).

The electrical signals received at inputs 1 and 3 are representative of speech. Each of the input signals may be divided into two parts occupying different frequency bands. First, the amplitude of the informational signal occupies a frequency band from just above direct current to include all frequencies to just below 100 Hertz amplitudes in respect to frequency. Second, the informational signal is considered to occupy a band from about 0.2 to 3.4 kHz with the same average power in each incremental band. Since the aforesaid electrical signals representative of speech are considered to be a convolution of vocal cord frequencies, glottal and voice box impulses, it may be represented by a product wave in the form of $f(A)t \times f(B)t$ where $f(A)t$ represents the amplitude of the informational signal $f(B)t$.

It is noted that the electrical voice signal is made up of relatively high frequencies in transmitting voiced signals and hiss signals in unvoiced components. Both types of signals are controlled by frequencies below about 30 Hertz. The high frequencies are transmitted directly and carry sidebands modulated by the low frequency control signals. In order to control and reduce the difference between talkers, the signal is demodulated to separate the components to reduce the range of the informational signal. The relative amplitude of the signal amplitude is changed by demodulating to obtain the signals at base band from 0–30 Hertz and 200 to about 4 K Hertz. That is, the signal transmitted is of the form a $\sin w_1 t \times b \cos w_2 t$ separating components to a $\sin w_1 t$ and $b \cos w_2 t$ and modifying the relative amplitude of the terms. This changes the range required in the medium when the low frequency component is changed (reduced) relative to the informational content contained in the second term.

The electrical signal in the form of $f(A)t \times f(B)t$, representative of speech, received at input 1 is fed through voltage controlled attenuator 5 and amplifier 6 to demodulator 7. Voltage controlled attenuator is conventional and its attenuation is controlled automatically by a voltage input at terminal 5a. Demodulator 7 permits the input signal thereto to be separated by way of high pass frequency branch 8 and low pass frequency branch 9 into their component parts $f(B)t$ and $f(A)t$, respectively. High pass frequency branch 8 consists of a series arrangement of high pass filter 9, amplifier 10 of a preselected gain, and high pass filter 11. Low pass frequency branch 9 consists of a series arrangement of low pass filter 12, conventional center clipper 13, amplifier 14 of a preselected gain, conventional limiter 14, and low pass filter 15. In place of conventional limiter 14 there may be substituted a regulator. The outputs from low pass frequency branch 9 and high pass frequency branch 8 are fed simultaneously to modulator 16. Modulator 16 provides a recombined output signal by way of amplifier 17.

It is noted that center clipper 13 reduces the voltages abruptly below the center clip amplitude and applies the modified signal to limiter 14. The output of the limiter is transmitted through low pass filter 15 to output modulator 16. The amplitude term modified as desired is modulated with the informational component to obtain a more constant or as desired convoluted signal for further application at optimum volume with a low standard deviation from a universe of long distance users. The component of the low frequency limiter signal is used to control the return loss to prevent circuit instabilities by application of this voltage component to conventional voltage controlled attenuator 18 by way of terminal 18a. It is emphasized that the attenuation provided by voltage controlled attenuator 18 changes only when there is an electrical signal representative of speech present at input 1.

Input 3 receives an electrical signal representative of speech in response to the one received at input 1. This represents the typical telephone conversation between two individuals. Conventional voltage controlled attenuator receives the aforesaid signal which is passed through amplifier 19 to demodulator 20 which then permits the product wave signal of $f(A) \times f(B)t$ to be separated by low pass frequency branch 21 and high pass frequency branch 22, respectively. Low pass frequency branch consists of series arrangement of low pass filter 23, conventional center clipper 24, amplifier 25 of preselected gain limiter 26, and low pass filter 27. In place of conventional limiter 26, there may be substituted a regulator. High pass frequency branch 22 consists of a series arrangement of high pass filter 28, amplifier 29 of preselected gain, and high pass filter 30. The output signals of low and high pass frequency branches 21 and 22 are fed simultaneously to modulator 31 for recombination. The recombined signal is fed through amplifier 32 to output 4. It is noted that when electrical signals representative of speech are received at input 1, voltage controlled attenuator operates to insert attenuation in the loop back to output 4 whereas when electrical signals representative of speech are received at input 3 voltage controlled attenuator operates to insert attenuation in the loop back to output 2.

It is again emphasized that the apparatus of FIG. 2 is used to interface between links in built up connections. After modification, the signal is applied to the ongoing link or trunk input. The signal received depends upon the character of the signal applied in the originating area and as modified for transmission. The signal applied in the originating area can be regulated or non-regulated. If the input signal is regulated, the variations added to the signal in the trunk are relatively small and except for the shift in mean volume from the originating area, could be passed to the ongoing link at design mean. When the input is nonregulated and subject to a systematic shift of the mean, the interface regulator (circuit) will correct the signal to the ongoing link to the desired mean volume as with reduced standard deviation.

It is noted that the present invention may be used as interfaces for four-wire link circuits between unknown originating volume areas in built up long distance trunk circuits. It provides increased output from low volume originating areas to drive long distance trunk circuits to design volume to deliver the desired signal to noise and preferred listening volume. It also reduces the range of volumes applied to long distance trunk circuits to reduce the per channel mile cost of long distance circuits. It further prevents overloading for signals originating in high volume areas. It still further permits a wider range of volumes to be applied to long distance trunks either in tactical or long distance service systems. It also reduces the range of signal amplitudes and frequency band required in secure communication systems.

What is claimed is:

1. A self regulator for interfacing links in built up long distance trunks comprising a first input terminal receiving first electrical signals representative of speech from one of said links, said electrical signal represented by product waves in the form of $f(A)t \times f(B)t$ where f(A)t represents the amplitude of informational signal f(B)t and a high frequency wave f(B)t, a first voltage controlled attenuator passing said electrical signals from said first input, said voltage controlled attenuator having a first control input for variation thereof, a first demodulator receiving the electrical signals from said first voltage controlled attenuator and providing output signals permitting separation thereafter of the signals representative of $f(A)t$ and $f(B)t$, a first low and high pass frequency branch exclusively passing said signals representative of $f(A)t$ and $f(B)t$, respectively, said low pass frequency branch consisting of a series arrangement, in sequence, of a first low pass filter, a center clipper, a first amplifier of preselected gain, a first limiter, and a second low pass filter, said high pass filter consisting of a first high pass filter, a second amplifier of preselected gain, and a second high pass filter, a first modulator for recombining the output signals from said low and high pass frequency branches, a first output terminal for said one link for receiving the recombined signals from said first modulator, a second voltage controlled attenuator having a second control input for variation of the attenuation thereof, said second control input receiving an input signal from said first limiter in response to the presence of an electrical signal at said first input terminal, a second input terminal for said one link receiving second electrical signals representative of speech also having the form of $f(A)t \times f(B)t$ and f(B)t and being received in response to said first electrical signals, a second demodulator receiving said second electrical signals by way of said second voltage controlled attenuator, a second low and high pass frequency branch receiving the output signal from said second modulator and passing exclusively signals representative of $f(A)t$ and $f(B)t$, respectively, said second low pass frequency branch consisting of a series arrangement, in sequence, of a third low pass filter, a second center clipper, a third amplifier of preselected gain, a second limiter, and a fourth low pass filter, said high pass frequency branch consisting of a series arrangement, in sequence, of a third high pass filter, a fourth amplifier of preselected gain, and a fourth high pass filter, said second limiter providing said first control input with a signal to vary the attenuation of said first voltage controlled attenuator, a second modulator receiving simultaneously signals from said second low and high pass frequency branches for recombination and a second output terminal for said one link receiving the recombined signals from said second modulator.

2. A self regulator for interfacing links as described in claim 1 further including a fifth amplifier connected between said first voltage controlled amplifier and said first demodulator and a sixth amplifier interconnecting said second voltage controlled amplifier and said second demodulator.

* * * * *